United States Patent [19]
Long et al.

[11] Patent Number: 4,579,371
[45] Date of Patent: Apr. 1, 1986

[54] DOCUMENT HAVING CONCEALED ELECTRICALLY CONDUCTIVE AUTHENTICATING LAYER

[75] Inventors: William H. Long; Richard M. Fischer, Jr., both of St. Paul, Minn.

[73] Assignee: Minnesota Mining and Manufacturing Company, St. Paul, Minn.

[21] Appl. No.: 565,453

[22] Filed: Dec. 27, 1983

[51] Int. Cl.$^4$ .................. B42D 15/00; B41M 3/08
[52] U.S. Cl. ........................... 283/83; 283/70; 427/7
[58] Field of Search ............ 283/70, 82, 83, 94, 283/72; 427/7

[56] References Cited
U.S. PATENT DOCUMENTS

| | | | |
|---|---|---|---|
| 3,245,697 | 4/1966 | Nugent | 283/83 |
| 3,801,183 | 4/1974 | Sevelin et al. | 350/105 |
| 3,922,430 | 11/1975 | Mayer | 283/83 |
| 4,025,759 | 5/1977 | Scheffel | 283/82 |
| 4,104,515 | 8/1978 | Thornburg et al. | 283/83 |
| 4,228,425 | 10/1980 | Cooke | 283/83 |
| 4,230,344 | 10/1980 | Bell, Jr. et al. | 283/83 |
| 4,455,039 | 6/1984 | Weitzen et al. | 283/82 |

Primary Examiner—Paul A. Bell
Assistant Examiner—Paul M. Heyrana
Attorney, Agent, or Firm—Donald M. Sell; James A. Smith; William B. Barte

[57] ABSTRACT

A standardized document such as a credit card or drivers license contains an electrically conductive authenticating layer which is not visually discernible and has an electrical resistivity of less than 50 megohms per square. The presence of the authenticating layer may be verified by a proximity switch that can be built into mechanisms normally used in processing the document.

7 Claims, 4 Drawing Figures

DOCUMENT HAVING CONCEALED ELECTRICALLY CONDUCTIVE AUTHENTICATING LAYER

FIELD OF THE INVENTION

The invention concerns a standardized document bearing visible indicia such as a credit card, a drivers license, or a label which contains a hidden device for providing added authentication of the document.

BACKGROUND ART

The counterfeiting of standardized documents such as passports and credit cards is a continuing problem. Even though credit cards and money cards generally carry magnetically readable stripes, they can easily be counterfeited. Drivers licenses commonly are laminates bearing a photograph beneath a transparent covering and also are easy to counterfeit. Some drivers licenses have been made more difficult to counterfeit by incorporating a legend which becomes visible only under retro-reflective viewing conditions as disclosed in U.S. Pat. No. 3,801,183 (Sevlin et al.). The same retro-reflective system has been used on phonograph labels. Even so, a need has continued for inexpensive techniques for making counterfeiting of standardized documents more difficult without appreciably adding to the cost of the documents or requiring expensive verifying equipment.

DISCLOSURE OF INVENTION

The present invention should satisfy that need by providing a standardized document including an authenticating layer of electrically conductive material uniformly dispersed in an organic binder, which layer extends over an area of at least 4 mm square and has an electrical resistivity of less than 50 megohms per square, the document being substantially visually indistinguishable from a document which would be identical except for omission of said layer.

By a "standardized" document is meant one of a large number of documents of like purpose and appearance such as credit cards, money cards, identification cards, drivers licenses, tickets, traveler's checks, passports, magnetic keys, labels such as for phonograph records, stock and bond certificates, and currency.

The electrically conductive material of the authenticating layer may comprise a mixture of ionizable salt and ionizing agent. Layers of many such mixtures in organic binders are colorless and almost completely transparent and hence can be almost invisible when applied to card stock or other materials of which standardized documents are made. However, the electrical conductivity of such an authenticating layer can vary considerably with changes in ambient humidity. To avoid variations in electrical conductivity, the electrically conductive material of the authenticating layer may comprise a semiconductive salt. Because semiconductive salts are usually colored, such layers should be applied to materials of the same color, thus providing virtual invisibility.

When the electrically conductive authenticating layer is colorless, it may cover the face of the document which is multi-colored without there being any visual indication of its presence. When the electrically conductive authenticating layer covers the face of the document, it may in turn be covered by a transparent protective plastic film, although this should not be necessary. Preferably the authenticating layer is an interior lamina. For example, it may be embedded in an interior fibrous layer which is laminated between a pair of plastic films. Instead, the electrically conductive authenticating layer mixture may comprise one of those surface plastic films.

The presence of the authenticating layer may be verified by a proximity switch that can be inexpensively and unobtrusively built into mechanisms such as are currently used either to make a visual record of raised characters or to reproduce information magnetically recorded on magnetic stripes. One useful proximity switch includes a normally oscillating coil and an antenna, and when the electrically conductive authenicating layer of a standardized document is placed adjacent the antenna, this interrupts the normally oscillating condition when the lateral electrical resistivity of the authenticating layer is less than a preset value. When the authenticating layer covers only a portion of the standardized document, that portion should be in the same position for all documents, and the antenna should be positioned adjacent that portion. A proximity switch as described is marketed by Automatic Timing Controls as Proximitrol Switch Series 705.

Another useful proximity switch includes a capacitor plate and a coil which normally does not oscillate. When an electrically conductive document is placed against its capacitor plate, this adds sufficient capacitance to the circuit to produce oscillations in the coil. A proximity switch which so functions is marketed by Turck Multiplex Inc. as Model BC20-K405R-VN6X.

Either type of proximity switch can be adjusted to switch from its normal condition whenever the electrical resistivity of a document is less than 50 megohms per square. However, it is preferred to provide documents having a resistivity below 2 megohms per square and to adjust the switching to occur whenever the resistivity is below that value. This provides greater assurance against switching due to spurious, low order conductivity.

The failure to switch either from a normally oscillating or nonoscillating condition to the opposite condition can provide audible and/or visual signalling that the standardized document may not be valid. Electrical signals to that effect may be electrically transmitted elsewhere.

THE DRAWING

In the drawing

Figure 1:
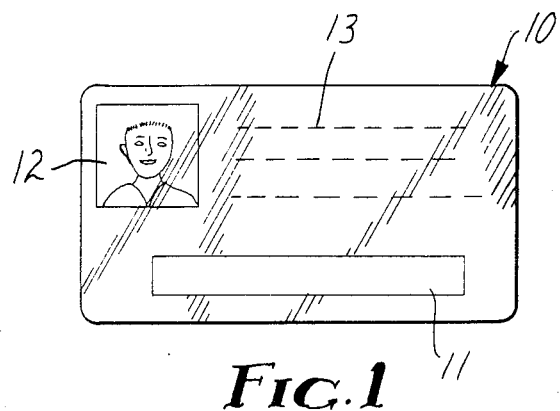
FIG. 1 shows the face of a standardized document of the invention in the form of an identification card.
Figure 2:
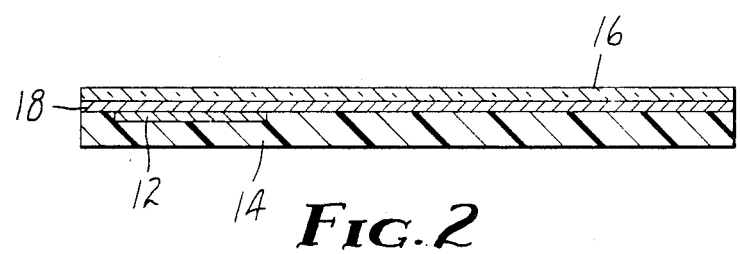
FIG. 2 is an enlarged schematic cross-section of the document of FIG. 1.

The standardized document 10 shown in FIGS. 1 and 2 includes the bearer's photograph 12 which is sandwiched between an opaque plastic base layer 14 and a coextensive transparent plastic protective layer 16. Overlying the photograph 12 and the base layer 14 and beneath the transparent protective layer 16 is a transparent authenticating layer 18 of electrically conductive material dispersed in an organic binder, which layer does not interfere with viewing of the photograph, a signature block 11, and printed indicia 13 on the base layer. More commonly a single photograph includes a signature, printed indicia and the bearer's likeness.

Figure 3:
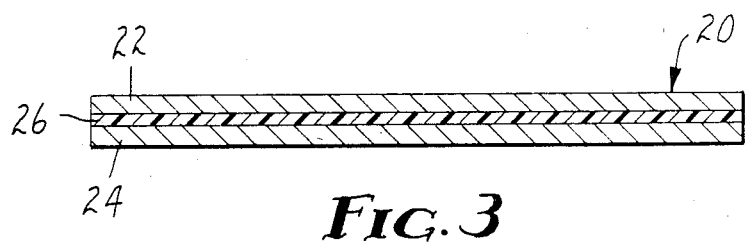
FIG. 3 is a schematic cross-section of a second standardized document of the invention.

The standardized document 20 shown in FIG. 3 has protective top and base layers 22 and 24 of paper sandwiching an authenticating layer 26 comprising a colorless electrically conductive mixture of ionizable salt and ionizing agent dispersed in a colorless organic binder.

Figure 4:
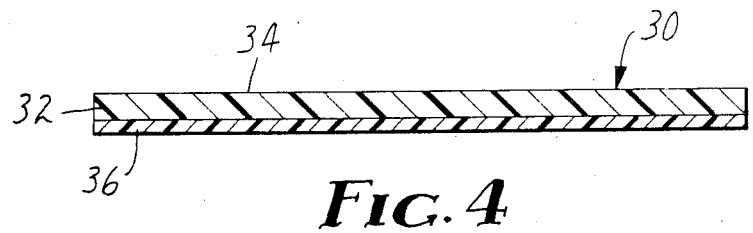
FIG. 4 is a schematic cross-section of a third standardized document of the invention.

The standardized document 30 shown in FIG. 4 has a plastic base layer 32 bearing printed indicia (not shown) on its front face 34. An electrically conductive authenticating layer 36 on the backside of the base layer comprises a semiconductive salt dispersed in an organic binder. Since the salt may be colored, the plastic base layer should have the same color to make the layer 36 virtually invisible.

AUTHENTICATING LAYER 1

To a solution of 8.7 g of polyacrylic acid in 21.3 g of deionized water were added 7.8 g of glycerin and 7.8 g of sodium acetate with stirring until totally dissolved. Using a notched bar coater, a 0.375 mm wet coating of this solution was applied to a 0.05 mm polyester film, namely biaxially-oriented polyethylene terephthalate film. This was heated at 65° C. for 20 minutes to provide a dried electrically conductive authenticating layer comprising sodium acetate ionizable salt and glycerin ionizing agent in polyacrylic acid binder and having a resistivity of 1.2 megohms per square.

Identical polyester film, the same coater, and the same drying conditions were used in making Authenticating Layers 2–6.

AUTHENTICATING LAYER 2

Nine grams of polyvinyl alcohol ("Vinol" 165) were dissolved in 100 g of deionized water with heating and stirring. To this solution were added 5 g of ammonium salicylate, 5 g of glycerin, and 0.2 g of disodium ethylenediamine tetraacetate. After mixing, a clear solution was obtained. When a 0.375 mm wet coating of this solution was coated onto a polyester film, the dried authenticating layer had a resistivity of 4 megohms per square.

AUTHENTICATING LAYER 3

To a solution of 5 g of polyvinylpyrrolidone (MW-360,000) in 20 g of methanol were added 5 g of polyethylene glycol (MW-400) and 0.5 g of sodium acetate with agitation until completely dissolved. A 0.375 mm wet coating dried to provide an authenticating layer having a resistivity of 2.5 megohms per square.

AUTHENTICATING LAYER 4

A solution identical to that used in preparing Authenticating Layer 3, except containing 1.0 g of sodium acetate, provided an electrical resistivity of 0.6 megohm per square.

AUTHENTICATING LAYER 5

Glycerin (0.5 g) and sodium benzoate (0.5 g) were dissolved in 5 g of a 29% polyacrylic acid/deionized water solution. A 0.375 mm wet coating applied to polyester film and dried as was Authenticating Layer 1 exhibited infinite electrical resistance at 23° C. When heated to 67° C., its resistivity dropped to 50 megohms per square.

AUTHENTICATING LAYER 6

Lithium benzoate (0.5 g), glycerin (4 g), sodium acetate (0.5), and disodium ethylenediamine tetracetate (0.5 g) were dissolved in 50 g of a 9% solution of polyvinylalcohol in deionized water. A coating dried as was Authenticating Layer 1 exhibited infinite electrical resistance at 23° C. When heated to 71° C., its resistivity dropped to 50 megohms per square.

EXAMPLES 1–6

Each of Authenticating Layers 1–6 was adhered to the front face of a facsimile drivers license using a pressure-sensitive adhesive bonding layer of 0.025 mm thickness, with the polyester film serving as a transparent plastic protective covering. Each of the resulting documents (Examples 1–6, respectively) was tested with each of the above-described proximity switches, each of which had first been adjusted to sense the presence of a layer having an electrical resistivity of less than 5 megohms per square. Each of the documents of Examples 1–4 caused switching in each proximity switch at ordinary room temperature.

When documents of Examples 5 and 6 were tested at ordinary room temperature with the proximity switches reset to sense the presence of a layer having a resistivity of less than 50 megohms per square, neither proximity switch responded. When heated to 67° and 71° C., respectively, each of the documents caused switching in each proximity switch.

Each of the documents containing Authenticating Layers 1–6 was visually compared to a document which was identical except for omission of the electrically conductive authenticating layer. No visual difference was noted.

A document was prepared as in Example 2 (Authenticating Layer 2) except that the electrically conductive authenticating layer extended over only one-half of its area. That half was visually indistinguishable from the other half.

EXAMPLE 7

A solution of 1.4 g of cuprous iodide in 42 g of acetonitrile was combined with 7 ml of a 5% solution of cellulose acetate butyrate in acetonitrile. After filtering, this was coated directly onto the back face of a facsimile drivers license at a wet thickness of 0.13 mm. This was dried for 10 minutes at 100° C. to provide an authenticating layer having a resistivity of 0.4 megohm per square.

The document of Example 7 caused switching at ordinary room temperature of each of the above-described proximity switches.

Because authenticating layer of the document of Example 7 produced a pale green color, it changed the color of the facsimile drivers license but could have been hidden by adhering it to a substrate of the same color.

We claim:

1. A standardized document including an authenticating layer of electrically conductive material comprising a mixture of ionizable salt and ionizing agent uniformly dispersed in an organic binder, which layer extends over an area of at least 4 mm square and has an electrical resistivity of less than 50 megohms per square, the document being substantially visually indistinguishable from a document which would be identical except for omission of said layer, and a transparent protective plastic film covering said authenticating layer.

2. Document as defined in claim 1 wherein the authenticating layer has an electrical resistivity of less than 500,000 ohms per square.

3. Document as defined in claim 1 wherein the authenticating layer is coextensive with the document.

4. Document as defined in claim 3 wherein the authenticating layer covers the face of the document.

5. Document as defined in claim 1 wherein the electrically conductive material and organic binder are colorless.

6. Document as defined in claim 1 wherein the conductive material comprises semiconductive salt.

7. Document as defined in claim 6 wherein the semiconductive salt is colored and a surface of the document which bears said authenticating layer has the same color.

* * * * *